(12) United States Patent
Lei et al.

(10) Patent No.: US 11,888,625 B2
(45) Date of Patent: Jan. 30, 2024

(54) HARQ-ACK TRANSMISSION ON UNLICENSED SPECTRUM

(71) Applicant: LENOVO (BEIJING) LIMITED, Beijing (CN)

(72) Inventors: Haipeng Lei, Beijing (CN); Alexander Golitschek Edler von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 485 days.

(21) Appl. No.: 17/279,581

(22) PCT Filed: Dec. 28, 2018

(86) PCT No.: PCT/CN2018/124773
§ 371 (c)(1),
(2) Date: Mar. 25, 2021

(87) PCT Pub. No.: WO2020/133184
PCT Pub. Date: Jul. 2, 2020

(65) Prior Publication Data
US 2021/0344453 A1 Nov. 4, 2021

(51) Int. Cl.
*H04L 1/1812* (2023.01)
*H04L 1/1867* (2023.01)
(Continued)

(52) U.S. Cl.
CPC .......... *H04L 1/1819* (2013.01); *H04L 1/1896* (2013.01); *H04W 72/0446* (2013.01); *H04W 72/23* (2023.01); *H04W 74/0816* (2013.01)

(58) Field of Classification Search
None
See application file for complete search history.

(56) References Cited

U.S. PATENT DOCUMENTS

2021/0314095 A1* 10/2021 Gao ..................... H04L 1/1812
2021/0314102 A1* 10/2021 Li ......................... H04L 1/1896

FOREIGN PATENT DOCUMENTS

WO    2011099926 A1    8/2011
WO    2016198734 A1    12/2016
(Continued)

OTHER PUBLICATIONS

Mediatek Inc., Enhancements on HARQ for NR-U operation, 3GPP TSG RAN WG1 Meeting #94bis, R1-1810444, Oct. 8-12, 2018, pp. 1-6, Chengdu, China.
(Continued)

*Primary Examiner* — Walter J Divito
(74) *Attorney, Agent, or Firm* — Kunzler Bean & Adamson

(57) ABSTRACT

Methods and apparatuses for HARQ-ACK codebook transmission on unlicensed spectrum are disclosed. A remote unit comprising: a receiver that receives, from a base unit, one or multiple downlink transmissions within a channel occupancy time initiated by the base unit, a first message indicating a first candidate opportunity for transmission of a Hybrid Automatic Repeat Request-Acknowledgement (HARQ-ACK) codebook corresponding to the one or multiple downlink transmissions and a second message indicating a number of allowed opportunities for transmission of the HARQ-ACK codebook; a processor that determines the HARQ-ACK codebook and a number of total candidate opportunities for transmission of the HARQ-ACK codebook; and a transmitter that, in response to a channel access for the first candidate opportunity being successful, transmits the HARQ-ACK codebook in the first candidate opportunity, and, in response to the channel access for the first candidate opportunity being failed and the number of the total candidate opportunities being larger than one, attempts (Continued)

to transmit the HARQ-ACK codebook in a second candidate opportunity.

20 Claims, 5 Drawing Sheets

(51) Int. Cl.
*H04W 72/0446* (2023.01)
*H04W 74/08* (2009.01)
*H04W 72/23* (2023.01)

(56) References Cited

FOREIGN PATENT DOCUMENTS

| WO | 2017120804 A1 | 7/2017 |
| WO | 2017123356 A1 | 7/2017 |
| WO | 2018128474 A1 | 7/2018 |

OTHER PUBLICATIONS

Samsung, HARQ enhancements for NR-U, 3GPP TSG RAN WG1 Meeting #95, R1-1812979, Nov. 12-16, 2018, pp. 1-5, Spokane, USA.

International Searching Authority, "Notification of Transmittal of the International Search Report and the Written Opinion of the International Searching Authority, or the Declaration", PCT/CN2018/124773, dated Dec. 28, 2018, pp. 1-6.

* cited by examiner

HARQ-ACK TRANSMISSION ON UNLICENSED SPECTRUM

FIELD

The subject matter disclosed herein generally relates to wireless communications and, more particularly, to HARQ-ACK codebook transmission on unlicensed spectrum.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Physical Uplink Shared Channel (PUSCH), Physical Uplink Control Channel (PUCCH), Physical Downlink Shared Channel (PDSCH), Time division multiplexing (TDM), Code division multiplexing (CDM), Orthogonal Cover Code (OCC), Cycling Shift (CS), Physical Resource Block (PRB), Hybrid Automatic Repeat Request-Acknowledgement (HARQ-ACK), Positive Acknowledgement (ACK), Negative Acknowledgement (NACK), Media Access Control-Control Element (MAC-CE). Listen Before Talk (LBT), Clear Channel Assessment (CCA), Channel Occupancy Time (COT), Maximum Channel Occupancy Time (MCOT), Radio Resource Control (RRC), cyclic prefix (CP), downlink control indicator (DCI), NR-access on unlicensed spectrum (NR-U).

Downlink (DL) TBs (transport blocks) are carried on Physical Downlink Shared Channel (PDSCH) in 3GPP LTE Release 8 and onwards. HARQ-ACK represents collectively Positive Acknowledgement (ACK) and Negative Acknowledgement (NACK). The ACK means that a TB is correctly received while the NACK means a TB is erroneously received. The HARQ-ACK codebook corresponding to the PDSCH transmission are transmitted either on a Physical Uplink Control Channel (PUCCH) or on a Physical Uplink Shared Channel (PUSCH)

For transmission on unlicensed spectrum, in order to achieve fair coexistence with other wireless systems, channel access procedure, also named LBT (listen before talk), is required before the transmission on unlicensed spectrum. By means of performing energy detection on a certain channel, if the received power is below a predefined threshold, then the LBT is successful, which means the channel is deemed as empty and available for transmission. Only when the LBT is successful, an equipment can start transmitting on the channel to occupy the channel up to a maximum channel occupancy time (MCOT); otherwise, the equipment can't start the transmission and continues to performing LBT until it is successful.

LBT includes several types of operations. For example, one type of the operation is LBT Category 4 operation with a random backoff counter selected from a variable contention window (like type 1 UL channel access procedure for UL LBT). Another type of the operation is LBT Category 2 with one-shot LBT operation with at least 25 μs sensing interval (like type 2 UL channel access procedure for UL LBT).

Upon reception of DL grant for scheduling PDSCH transmission, UE attempts to transmit the corresponding HARQ-ACK codebook in the targeted slot based on the PDSCH-to-HARQ-timing field in the DL grant. The PDSCH-to-HARQ-timing field indicates one value from K1 set. The K1 set includes up to 8 values and the values are within the range of 0 to 15. Each value indicates the offset between the slot where PDSCH is received and the slot where the corresponding HARQ-ACK codebook is transmitted. The offset is indicated in unit of slots. For example, suppose the last PDSCH is received at slot 3 and the PDSCH-to-HARQ-timing field indicates a value 3, the HARQ-ACK codebook would be transmitted at slot 6.

When the HARQ-ACK codebook is transmitted on unlicensed spectrum, if LBT fails, the HARQ-ACK codebook cannot be transmitted to gNB.

In order to solve this problem, it is beneficial to allow multiple opportunities in time domain for a UE to transmit one HARQ-ACK codebook. In detail, a HARQ-ACK codebook feedback window comprising multiple consecutive or non-consecutive slots can be configured and UE is allowed to transmit one HARQ-ACK codebook within the feedback window. Particularly, UE performs LBT for each transmission opportunity and transmits the HARQ-ACK codebook in a certain slot once the LBT for the slot is successful.

The remaining transmission opportunities within the feedback window can be left unused since only one HARQ-ACK codebook transmission is enough. Alternatively, the HARQ-ACK codebook can be transmitted repeatedly in the remaining transmission opportunities till the end of the feedback window as long as the LBT for a certain transmission opportunity is successful. In this way, the HARQ-ACK transmission reliability can be further enhanced.

One example is shown in FIG. 4 that depicts HARQ-ACK codebook for PDSCHs transmissions received in slots 0, 1, 2 and 3, transmitted in one PUCCH slot and has RRC configured four consecutive transmission opportunities. If the LBT for the first transmission attempt in slot 4 is not successful, then UE continues LBT for the second transmission attempt in slot 5. If the LBT for the second transmission attempt in slot 5 is successful, then the HARQ-ACK codebook is transmitted in slot 5 and the remaining PUCCH resources allocated for slot 6 and 7 are unused or to be used for PUCCH repetition.

However, it is obvious that this kind of HARQ-ACK transmission on unlicensed spectrum may lead to PUCCH resource waste. Especially, when the target slot for HARQ-ACK transmission is within the gNB-initiated COT, the channel access procedure has relatively higher possibility to win the competition of LBT, compared to the case when HARQ-ACK transmission is outside of the gNB-initiated COT. Semi-statically configured number of transmission opportunities inevitably causes resource waste.

In this disclosure, we focus on the further enhancement of HARQ-ACK transmission on unlicensed spectrum in order to flexibly and dynamically change the number of transmission opportunities for HARQ-ACK codebook.

BRIEF SUMMARY

Methods and apparatuses for HARQ-ACK codebook transmission on unlicensed spectrum are disclosed.

In one embodiment, a remote unit comprises: a receiver that receives, from a base unit, one or multiple downlink transmissions within a channel occupancy time initiated by the base unit, a first message indicating a first candidate opportunity for transmission of a Hybrid Automatic Repeat Request-Acknowledgement (HARQ-ACK) codebook corresponding to the one or multiple downlink transmissions and a second message indicating a number of allowed opportunities for transmission of the HARQ-ACK codebook; a processor that determines the HARQ-ACK codebook and a number of total candidate opportunities for transmission of the HARQ-ACK codebook; and a transmitter that, in response to a channel access for the first candidate opportunity being successful, transmits the HARQ-ACK codebook in the first candidate opportunity, and, in response to the channel access for the first candidate opportunity being failed and the number of the total candidate opportunities being larger than one, attempts to transmit the HARQ-ACK codebook in a second candidate opportunity. In addition, in response to the channel access for the second candidate opportunity being failed, the transmitter attempts to transmit the HARQ-ACK codebook in a next candidate opportunity as long as there exists the next candidate opportunity among the total candidate opportunities.

In some embodiment, the processor determines the number of total candidate opportunities based on the first candidate opportunity being inside or outside of the channel occupancy time. In particular, the number of total candidate opportunities is equal to one in response to the first candidate opportunity being inside of the channel occupancy time, and is equal to the number of allowed opportunities in response to the first candidate opportunity being outside of the channel occupancy time.

In some embodiment, the first message is received in a Radio Resource Control (RRC) signaling and the receiver further receives an indicator in downlink control indicator (DCI) indicating enabling or disabling multiple opportunities for transmission of the HARQ-ACK codebook. In this condition, the processor determines the number of total candidate opportunities being equal to one in response to the indicator indicating disabling multiple opportunities, and being equal to the number of allowed opportunities in response to the indicator indicating enabling multiple opportunities.

In some embodiment, the receiver further receives an indicator indicating the first candidate opportunity being inside or outside of the channel occupancy time. In this condition, the processor determines the number of total candidate opportunities being equals to one in response to the indicator indicating the first candidate opportunity being inside of the channel occupancy time, and being equal to the number of allowed opportunities in response to the indicator indicating the first candidate opportunity being outside of the channel occupancy time. In addition, the processor further determines the type of the channel access being Listen Before Talk (LBT) Category 2 with at least 25 μs Clear Channel Assessment (CCA) in response to the first candidate opportunity being inside of the channel occupancy time, and being LBT Category 4 in response to the first candidate opportunity being outside of the channel occupancy time.

In some embodiment, the first message is received in DCI and the number of the total candidate opportunities is equal to the number of the allowed opportunities. Alternatively, the receiver receives a RRC signaling for configuring a set of values each of which indicates a number of allowed opportunities, and the first message is received in DCI for indicating one value of the set. Further alternatively, the receiver receives a RRC signaling for configuring a set of Physical Uplink Control Channel (PUCCH) resources each of which includes resource repetition information, and the first message is received in DCI for indicating one resource of the set. As another implementation, the receiver receives a RRC signaling for configuring multiple subsets in a set of PDSCH-to-HARQ timing values and each of the multiple subsets includes one or multiple opportunities for transmission of the HARQ-ACK codebook, and the first message is received in DCI for indicating one subset of the set of PDSCH-to-HARQ timing values. As yet another implementation, the receiver receives a RRC signaling for configuring multiple subsets in a set of PDSCH-to-HARQ timing values and each of the multiple subsets includes the first candidate opportunity and the number of allowed opportunities, and the first message is received in DCI for indicating one subset of the set of PDSCH-to-HARQ timing values.

In some embodiment, a number of opportunities for transmission of the HARQ-ACK codebook is at least one in one slot.

In another embodiment, a method a remote unit comprises: receiving, from a base unit, one or multiple downlink transmissions within a channel occupancy time initiated by the base unit, a first message indicating a first candidate opportunity for transmission of a Hybrid Automatic Repeat Request-Acknowledgement (HARQ-ACK) codebook corresponding to the one or multiple downlink transmissions and a second message indicating a number of allowed opportunities for transmission of the HARQ-ACK codebook; determining the HARQ-ACK codebook and a number of total candidate opportunities for transmission of the HARQ-ACK codebook; and in response to a channel access for the first candidate opportunity being successful, transmitting the HARQ-ACK codebook in the first candidate opportunity, and, in response to the channel access for the first candidate opportunity being failed and the number of the total candidate opportunities being larger than one, attempting to transmit the HARQ-ACK codebook in a second candidate opportunity.

In yet another embodiment, a base unit comprises: a transmitter that transmits, to a remote unit, one or multiple downlink transmissions within a channel occupancy time, a first message indicating a first candidate opportunity for transmission of a Hybrid Automatic Repeat Request-Acknowledgement (HARQ-ACK) codebook corresponding to the one or multiple downlink transmissions and a second message indicating a number of allowed opportunities for transmission of the HARQ-ACK codebook; and a receiver that attempts to receive the HARQ-ACK codebook in the first candidate opportunity, and attempts to receive the HARQ-ACK codebook in a second candidate opportunity in response to the reception of the HARQ-ACK codebook in the first candidate opportunity being failed and the number of a total candidate opportunities being larger than one.

In further embodiment, a method at a base unit comprises: transmitting, to a remote unit, one or multiple downlink transmissions within a channel occupancy time, a first message indicating a first candidate opportunity for transmission of a Hybrid Automatic Repeat Request-Acknowledgement (HARQ-ACK) codebook corresponding to the one or multiple downlink transmissions and a second message indicating a number of allowed opportunities for transmission of the HARQ-ACK codebook; and attempting to receive the HARQ-ACK codebook in the first candidate opportunity, and attempting to receive the HARQ-ACK codebook in a second candidate opportunity in response to the reception of the HARQ-ACK codebook in the first candidate opportunity being failed and the number of a total candidate opportunities being larger than one.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered as limiting of scope, the embodiments will be described and explained with additional specificity and detail using accompanying drawings, in which.

DETAILED DESCRIPTION

Figure 1:
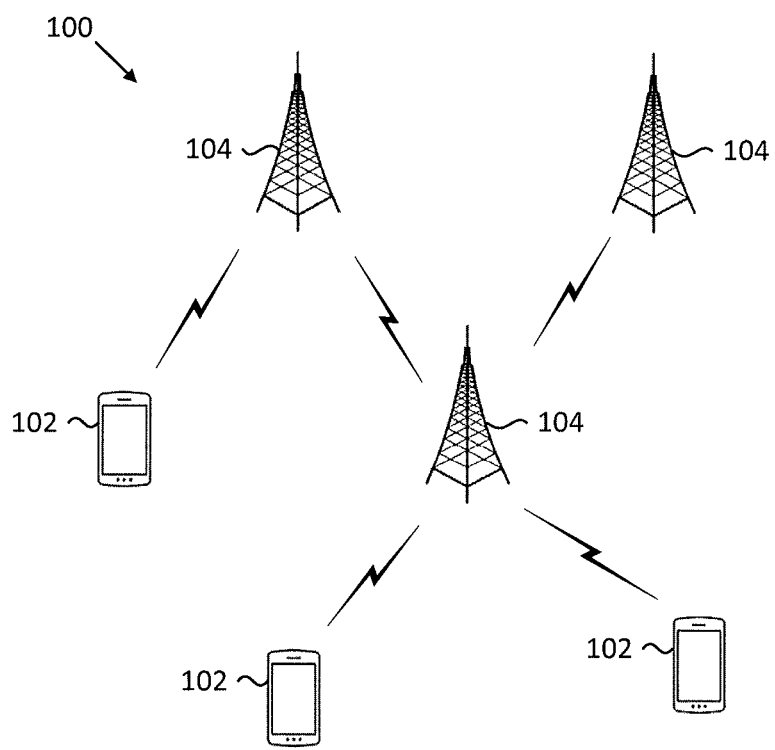
FIG. 1 is a schematic block diagram illustrating one embodiment of a wireless communication system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for HARQ-ACK codebook transmission on unlicensed spectrum. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art.

The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

Figure 2:
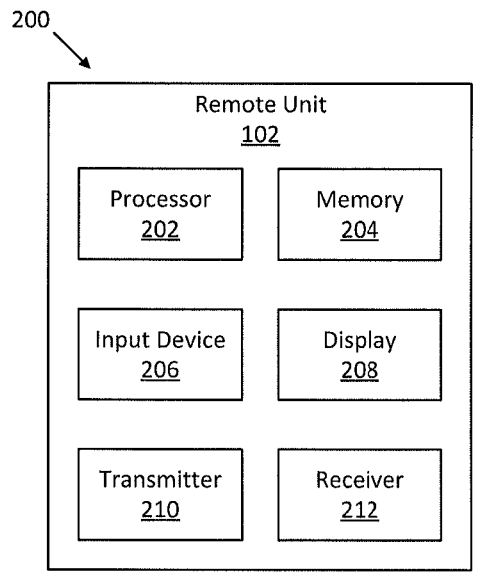
FIG. 2 is a schematic block diagram illustrating one embodiment of an apparatus that may be used for HARQ-ACK transmission on unlicensed spectrum.

FIG. 2 depicts one embodiment of an apparatus 200 that may be used for HARQ-ACK codebook transmission on unlicensed spectrum. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
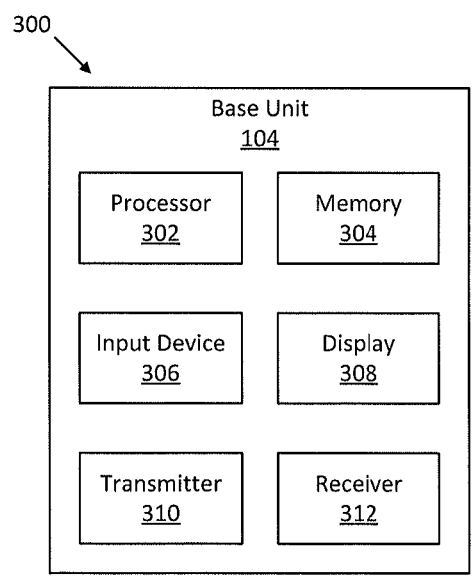
FIG. 3 is a schematic block diagram illustrating one embodiment of another apparatus that may be used for HARQ-ACK transmission on unlicensed spectrum.

FIG. 3 depicts one embodiment of another apparatus 300 that may be used for HARQ-ACK codebook transmission on unlicensed spectrum. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
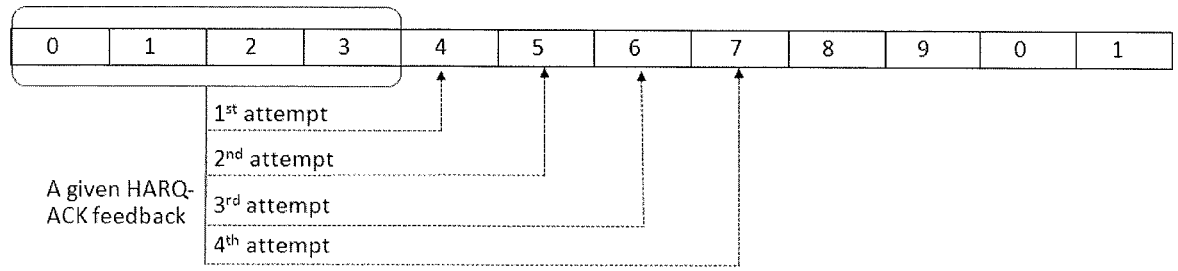
FIG. 4 is a schematic diagram illustrating multiple transmission opportunities for transmitting one HARQ-ACK codebook.

In FIG. 4, a HARQ-ACK codebook feedback window including four slots is semi-statically configured. The slot(s) after the slot for which the LBT is successful are unused or to be used for retransmission of the transmitted HARQ-ACK codebook. In the condition that there is high possibility that the LBT for the first candidate slot is successful, the resource waste is inevitable.

According to a first embodiment, one bit in DCI is used to indicate enabling or disabling the multiple candidate slots for one HARQ-ACK codebook.

For example, the bit may be set to "1" as an enabling indicator that indicates that one HARQ-ACK codebook is allowed to be transmitted in multiple consecutive candidate slots, i.e., the HARQ-ACK codebook is allowed to have N transmission opportunities. N is configured by RRC signaling. The first candidate slot for the HARQ-ACK codebook transmission is indicated by PDSCH-to-HARQ-timing field in the DCI. The PDSCH-to-HARQ-timing field indicates one value from K1 set that indicates an offset between the slot where PDSCH is received and the first candidate slot where the HARQ-ACK codebook is to be transmitted.

The bit may alternatively be set to "0" as a disabling indicator that indicates that the HARQ-ACK codebook is allowed to be transmitted with only one opportunity, i.e. only in the slot indicated by PDSCH-to-HARQ-timing field in DCI.

According to the first embodiment, one bit in DCI explicitly enables or disables the multiple transmission opportunities for one HARQ-ACK codebook transmission.

According to a second embodiment, one bit in DCI is used to indicate whether the HARQ-ACK codebook is to be transmitted inside of a gNB-initiated COT or outside of the gNB-initiated COT.

Figure 5:
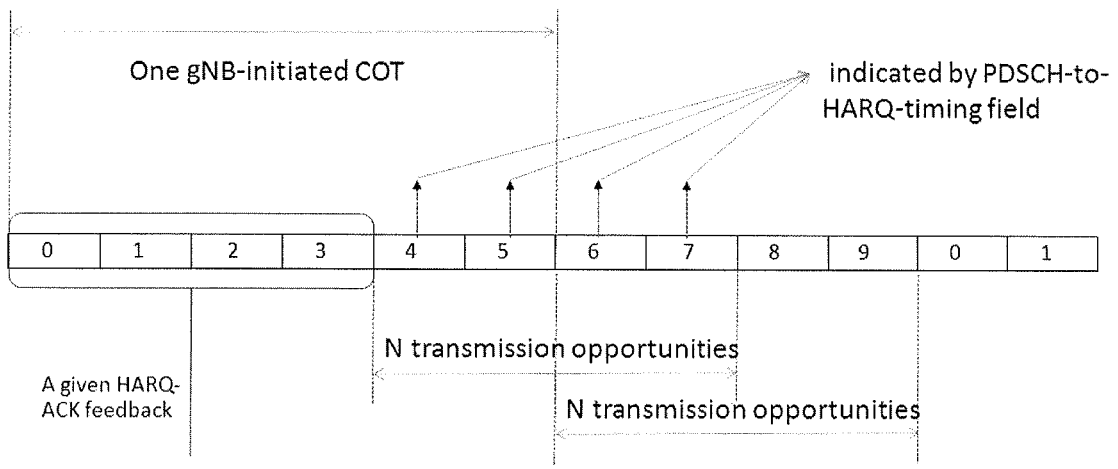
FIG. 5 is a schematic diagram illustrating gNB-initiated COT with HARQ-ACK codebook transmission on unlicensed spectrum.

The gNB-initiated COT is a plurality of slots acquired by a gNB after successful LBT. The COT may include slots used for DL transmissions and slot(s) used for UL transmission. FIG. 5 is a schematic diagram illustrating gNB-initiated COT with HARQ-ACK codebook transmission on unlicensed spectrum. In FIG. 5, slots 0-5 are within the gNB-initiated COT. As an example, slots 0-3 are the slots used for the gNB to send DL transmissions to the UE and slots 4-5 are the slots used for the UE to send HARQ-ACK codebook to the gNB.

There is high possibility that the LBT for the slot inside of the gNB-initiated COT is successful for the UE. On the other hand, there is low possibility that the LBT for the slot outside of the gNB-initiated COT is successful for the UE.

The DCI bit, according to the second embodiment, may be set to "1" to indicate that the HARQ-ACK codebook is to be transmitted inside of the gNB-initiated COT. Alternatively, the bit may be set to "0" to indicate that the HARQ-ACK codebook is to be transmitted outside of the gNB-initiated COT.

There are various variations on whether one HARQ-ACK codebook is allowed to be transmitted with only one opportunity or in multiple consecutive candidate slots.

In a first variation of the second embodiment, in the condition that the DCI bit is set to "1" to indicate that the HARQ-ACK codebook is to be transmitted inside of the gNB-initiated COT, the HARQ-ACK codebook is allowed to be transmitted with only one opportunity, i.e., only in the slot indicated by PDSCH-to-HARQ-timing field in DCI. As there might be more than one slot (for example, slots 4 and 5 shown in FIG. 5) for UL transmission inside of the gNB-initiated COT, the PDSCH-to-HARQ-timing field of DCI indicates the only one slot for transmission of the HARQ-ACK codebook. In this case, LBT Category 2 with at least 25 μs CCA may be used for the HARQ-ACK codebook transmission, and there is high possibility to succeed in LBT Category 2.

In the condition that the DCI bit is set to "0" to indicate that the HARQ-ACK codebook is to be transmitted outside of the gNB-initiated COT, the HARQ-ACK codebook is allowed to be transmitted in multiple consecutive candidate slots, i.e., the HARQ-ACK codebook is allowed to have N transmission opportunities, wherein N is configured by RRC signaling and the first candidate slot for the HARQ-ACK codebook transmission is indicated by PDSCH-to-HARQ-timing field in DCI. For example, if slot 6 is indicated as the first candidate slot, slots 6-9 are the multiple consecutive candidate slots in case of N being configured to 4. In this case, LBT Category 4 may be used for the HARQ-ACK codebook transmission, and there is lower possibility to succeed in LBT Category 4 than in LBT Category 2.

In a second variation of the second embodiment, in the condition that the DCI bit is set to "1" to indicate that the HARQ-ACK codebook is to be transmitted inside of the gNB-initiated COT, the HARQ-ACK codebook is allowed to be transmitted in multiple consecutive candidate slots, i.e., the HARQ-ACK codebook is allowed to have N transmission opportunities, wherein N is configured by RRC signaling and the first candidate slot for the HARQ-ACK codebook transmission is indicated by PDSCH-to-HARQ-timing field in DCI. In this case, LBT Category 2 with at least 25 μs CCA may be used for the HARQ-ACK codebook transmission, and there is high possibility to succeed in LBT Category 2. If the N transmission opportunities extend beyond the end of the gNB-initiated COT, the UE further attempts to transmit the HARQ-ACK codebook outside of the gNB-initiated COT, where LBT Category 4 may be used for the HARQ-ACK codebook transmission. As shown in FIG. 5, slot 4 is indicated as the first candidate slot. Slots 4-7 are the multiple consecutive candidate slots with N being configured to 4. For slots 4 and 5 inside of the gNB-initiated COT, LBT Category 2 is used. And for slots 6 and 7 outside of the gNB-initiated COT, LBT Category 4 is used.

In the condition that the DCI bit is set to "0" to indicate that the HARQ-ACK codebook is to be transmitted outside of the gNB-initiated COT, the second variation is the same as the first variation. In particular, the HARQ-ACK codebook is allowed to be transmitted in multiple consecutive candidate slots, i.e., the HARQ-ACK codebook is allowed to have N transmission opportunities, wherein N is configured by RRC signaling and the first candidate slot for the HARQ-ACK codebook transmission is indicated by PDSCH-to-HARQ-timing field in DCI. In this case, LBT Category 4 may be used for the HARQ-ACK codebook transmission, and there is low possibility to succeed in LBT Category 4.

In a third variation of the second embodiment, in the condition that the DCI bit is set to "1" to indicate that the HARQ-ACK codebook is to be transmitted inside of the gNB-initiated COT, the HARQ-ACK codebook is allowed to be transmitted in multiple consecutive candidate slots (the same as the second variation), i.e., the HARQ-ACK codebook is allowed to have N transmission opportunities, wherein N is configured by RRC signaling and the first candidate slot for the HARQ-ACK codebook transmission is indicated by PDSCH-to-HARQ-timing field in DCI. In this case, LBT Category 2 with at least 25 μs CCA may be used for the HARQ-ACK codebook transmission, and there is high possibility to succeed in LBT Category 2. Different from the second variation, in the third variation, no HARQ-ACK codebook transmission outside of the gNB-initiated COT is allowed, i.e. the number of candidate slots is upper-bounded by a smaller value of N and remaining slots inside of the gNB-initiated COT. As shown in FIG. 5, slot 4 is indicated as the first candidate slot. Slots 4-7 are the multiple consecutive candidate slots with N being configured to 4. For slots 4 and 5 inside of the gNB-initiated COT, LBT Category 2 is used. On the other side, although slots 6 and 7 are candidate slots with N being configured to 4, since slots 6 and 7 are outside of the gNB-initiated COT, they are not allowed for HARQ-ACK codebook transmission in the third variation.

In the condition that the DCI bit is set to "0" to indicate that the HARQ-ACK codebook is to be transmitted outside of the gNB-initiated COT, the third variation is the same as the first variation and the second variation. In particular, the HARQ-ACK codebook is allowed to be transmitted in multiple consecutive candidate slots, i.e., the HARQ-ACK codebook is allowed to have N transmission opportunities, wherein N is configured by RRC signaling and the first candidate slot for the HARQ-ACK codebook transmission is indicated by PDSCH-to-HARQ-timing field in DCI. In this case, LBT Category 4 may be used for the HARQ-ACK codebook transmission, and there is low possibility to succeed in LBT Category 4.

According to the second embodiment, one bit in DCI indicating whether the HARQ-ACK codebook transmission is inside or outside of the gNB-initiated COT is used to determine whether one or multiple transmission opportunities are allowed for the HARQ-ACK codebook transmission and determine the LBT type (LBT Category 2 or LBT Category 4).

According to a third embodiment, an implicit method is used for gNB and UE to determine whether one HARQ-ACK codebook is allowed to be transmitted with only one or more transmission opportunities.

In the beginning of the gNB-initiated COT, a COT structure indication is transmitted to the UE. The COT structure refers to UL/DL split pattern, the number and location of the UL-to-DL and DL-to-UL switching point(s), the location and duration of DL bursts and UL bursts including the starting position and the ending position of the gNB-initiated COT. An example of transmitting the COT structure indication is an indication in DCI format 2_0 that indicates the slot combinations for all the slots within the gNB-initiated COT.

Upon reception of PDSCH-to-HARQ-timing field in DCI for scheduling PDSCH transmission, the UE identifies the target slot for the corresponding HARQ-ACK codebook transmission, and accordingly determines whether the target slot is inside of the gNB-initiated COT or outside of the gNB-initiated COT.

In case that the HARQ-ACK codebook is to be transmitted inside of gNB-initiated COT, LBT Category 2 with at least 25 μs CCA may be used for the HARQ-ACK codebook transmission. UE knows the corresponding HARQ-ACK codebook is allowed to be transmitted with only one opportunity in the target slot. Instead, in case that the HARQ-ACK codebook is to be transmitted outside of gNB-initiated COT, LBT Category 4 may be used for the HARQ-ACK codebook transmission. So, UE knows the corresponding HARQ-ACK codebook is allowed to be transmitted in multiple consecutive candidate slots, i.e., the HARQ-ACK codebook is allowed to have N transmission opportunities, wherein N is configured by RRC signaling and the first candidate slot for the HARQ-ACK codebook transmission is the target slot indicated by PDSCH-to-HARQ-timing field in DCI.

For example, as shown in FIG. 5, in the condition that the gNB-initiated COT includes slots 0-5, if the PDSCH-to-HARQ-timing field in DCI indicates slot 4 or 5 that is inside of the gNB-initiated COT, the corresponding HARQ-ACK codebook is allowed to be transmitted with only one opportunity. And if the PDSCH-to-HARQ-timing field in DCI indicates for example slot 6 that is outside of the gNB-initiated COT, the HARQ-ACK codebook is allowed to have N transmission opportunities.

According to the third embodiment, whether one HARQ-ACK codebook is allowed to be transmitted with only one or more transmission opportunities is implicitly determined based on COT structure indication.

According to a fourth embodiment, one bit in DCI is used to indicate whether the HARQ-ACK codebook is to be transmitted using LBT Category 2 or LBT Category 4.

For example, such bit may be set to "1" to indicate that the HARQ-ACK codebook is to be transmitted using LBT Category 2 with at least 25 μs CCA. As there is high possibility to succeed in LBT Category 2, the HARQ-ACK codebook is allowed to be transmitted with only one opportunity, i.e., only in the slot indicated by PDSCH-to-HARQ-timing field in DCI.

Alternatively, the bit may be set to "0" to indicate that the HARQ-ACK codebook is to be transmitted using LBT Category 4. As there is low possibility to succeed in LBT Category 4, the HARQ-ACK codebook is allowed to be transmitted in multiple consecutive candidate slots, i.e., the HARQ-ACK codebook is allowed to have N transmission opportunities, wherein N is configured by RRC signaling and the first candidate slot for the HARQ-ACK codebook transmission is indicated by PDSCH-to-HARQ-timing field in DCI. Optionally, if the HARQ-ACK codebook transmission opportunity is within the gNB-initiated COT, the UE may attempt to use, instead of LBT Category 4, LBT Category 2 with at least 25 μs CCA for that transmission opportunity.

According to the fourth embodiment, one bit in DCI indicates whether the HARQ-ACK codebook is to be transmitted using LBT Category 2 or LBT Category 4 to determine whether one or multiple transmission opportunities are allowed for the HARQ-ACK codebook transmission.

In the first to the fourth embodiments, if multiple transmission opportunities are allowed for the HARQ-ACK codebook transmission, the number N of the multiple transmission opportunities is configured by RRC signaling, and the first candidate slot is determined according to the PDSCH-to-HARQ-timing field.

As the number N of the multiple transmission opportunities is semi-statically configured by RRC signaling, further improvement is possible.

According to a fifth embodiment, the number of the transmission opportunities for one HARQ-ACK codebook is explicitly indicated in DCI.

In particular, for DL transmission, the DCI for scheduling associated PDSCH transmission also indicates the transmission times for the corresponding HARQ-ACK codebook.

For example, assuming that one HARQ-ACK codebook can have 1, 2, 3 or 4 transmission opportunities in time domain, two bits in DCI are used to indicate the transmission times for one HARQ-ACK codebook. The first candidate slot for the HARQ-ACK codebook transmission is indicated by PDSCH-to-HARQ-timing field in DCI.

According to the fifth embodiment, the number of transmission opportunities is explicitly indicated in DCI to improve flexibility.

According to a sixth embodiment, a set of possible number of transmission opportunities for one HARQ-ACK codebook is configured by RRC and the DCI is used to indicate one value from the set.

In the fifth embodiment, if two bits in DCI are used, only 1, 2, 3 or 4 transmission opportunities can be configured. On the other hand, according to the sixth embodiment, a set of four possible number of transmission opportunities can be configured. For example, a set may be configured as {1, 2, 4, 8} by RRC and two bits in DCI are used to indicate one value of the set.

According to the sixth embodiment, for DL transmission, the DCI for scheduling associated PDSCH transmission also indicates the transmission times for the corresponding HARQ-ACK codebook. For example, each combination of the two bits may indicate one of the number of transmission opportunities configured in the set configured by RRC. The first candidate slot for the HARQ-ACK codebook transmission is indicated by PDSCH-to-HARQ-timing field in DCI.

According to the sixth embodiment, the number of transmission opportunities is indicated by RRC and DCI to further improve flexibility.

According to a seventh embodiment, subsets are configured in K1 set to support multiple candidate slots for one HARQ-ACK codebook transmission and PDSCH-to-HARQ-timing filed in DCI is used to indicate one of them.

For example, K1 set may be reconfigured to include a plurality of subsets of {x, y}, in which x is the offset from the slot where PDSCHs are transmitted and the first candidate slot where the transmission of the corresponding HARQ-ACK codebook is allowed; y is the total number of consecutive candidate slots for the transmission of the HARQ-ACK codebook. As an example, the K1 set may be configured as {{1, 1}, {1, 2}, {1, 4}, {2, 1}, {2, 2}, {2, 4}, {3, 1}, {3, 2}}. Therefore, an example of using 3-bit PDSCH-to-HARQ-timing field to indicate the candidate slots for HARQ-ACK codebook transmission is shown in below table.

| Index | First candidate slot, the total number of consecutive candidate slots |
| --- | --- |
| 000 | {1, 1} |
| 001 | {1, 2} |
| 010 | {1, 4} |
| 011 | {2, 1} |
| 100 | {2, 2} |
| 101 | {2, 4} |
| 110 | {3, 1} |
| 111 | {3, 2} |

Take FIG. 5 as an example, suppose the last slot where PDSCHs are transmitted is 3, if the 3-bit PDSCH-to-HARQ-timing field is set to "100", then the first candidate slot would be 3+2 (i.e. first candidate slot)=5, and the total number of consecutive candidate slots is 2. Therefore, the candidate slots would be slots 5 and 6.

According to the seventh embodiment, because the total number of consecutive candidate slots may be set to any number including 1, it is unnecessary to explicitly indicate whether the HARQ-ACK codebook is allowed to be transmitted with only one or multiple transmission opportunities.

According to an eighth embodiment, similar to the seventh embodiment, subsets are configured in K1 set to support one or multiple candidate slots for transmission of one HARQ-ACK codebook, and PDSCH-to-HARQ-timing filed in DCI is used to indicate one of the subsets.

The eighth embodiment differs from the seventh embodiment in that all of the candidate slots, instead of the first candidate slot and the number of consecutive candidate slots, are explicitly indicated in the subsets. For example, the K1 set may be configured as {{1}, {1, 2}, {1, 2, 3}, {1, 2, 3, 4}, {2}, {2, 3}, {2, 3, 4}, {2, 3, 4, 5}) to support up to 4 consecutive slots for one HARQ-ACK codebook transmission.

As all of candidate slots are explicitly indicated, the eighth embodiment can support, in addition to multiple consecutive candidate slots as above-identified, non-consecutive multiple candidate slots. For example, the K1 set may be configured as {{1}, {1, 3}, {1, 3, 5}, {2}, {2, 4}, {2, 4, 6}, {3}, {3, 5}}.

Each of the above-identified values in the subsets refers to a HARQ timing offset value. That is to say, suppose the last PDSCH is received at slot n, the number "1" means that the HARQ-ACK codebook shall be transmitted at the slot "n+1".

Take FIG. 5 as an example, suppose the last slot where PDSCHs are transmitted is 3, if the subset {2, 4} is indicated, then the candidate slots would be 3+2=5 and 3+4=7. Therefore, the candidate slots would be slots 5 and 7.

According to the seventh and eighth embodiments, new subsets in K1 set are introduced to indicate one or multiple candidate slots. The existing PDSCH-to-HARQ timing field is used to indicate one of the subsets.

According to a ninth embodiment, PUCCH resource set is configured to include the information of repetition number for each PUCCH resource so as to support multiple candidate slots for transmission of one HARQ-ACK codebook. PUCCH resource indicator field in DCI is used to indicate one of the repetition number.

For example, time-domain repetition number of 1, 2, 3 or 4 is added for PUCCH resource configuration to indicate multiple candidate slots of 1, 2, 3 or 4.

For DL transmission, the DCI for scheduling associated PDSCH transmission indicates the PUCCH resource for transmission of the corresponding HARQ-ACK codebook. The first candidate slot for transmission of the HARQ-ACK codebook is indicated by PDSCH-to-HARQ-timing field in DCI.

PUCCH resource indicator field indicates to UE which PUCCH resource is used for the transmission of HARQ-ACK codebook. If the time domain repetition number is more than 1, the indicated PUCCH resource is reused in the following slots.

According to the ninth embodiment, repetition number is added for PUCCH configuration so as to dynamically control the number of transmission opportunities by existing PUCCH resource indicator.

Figure 6:
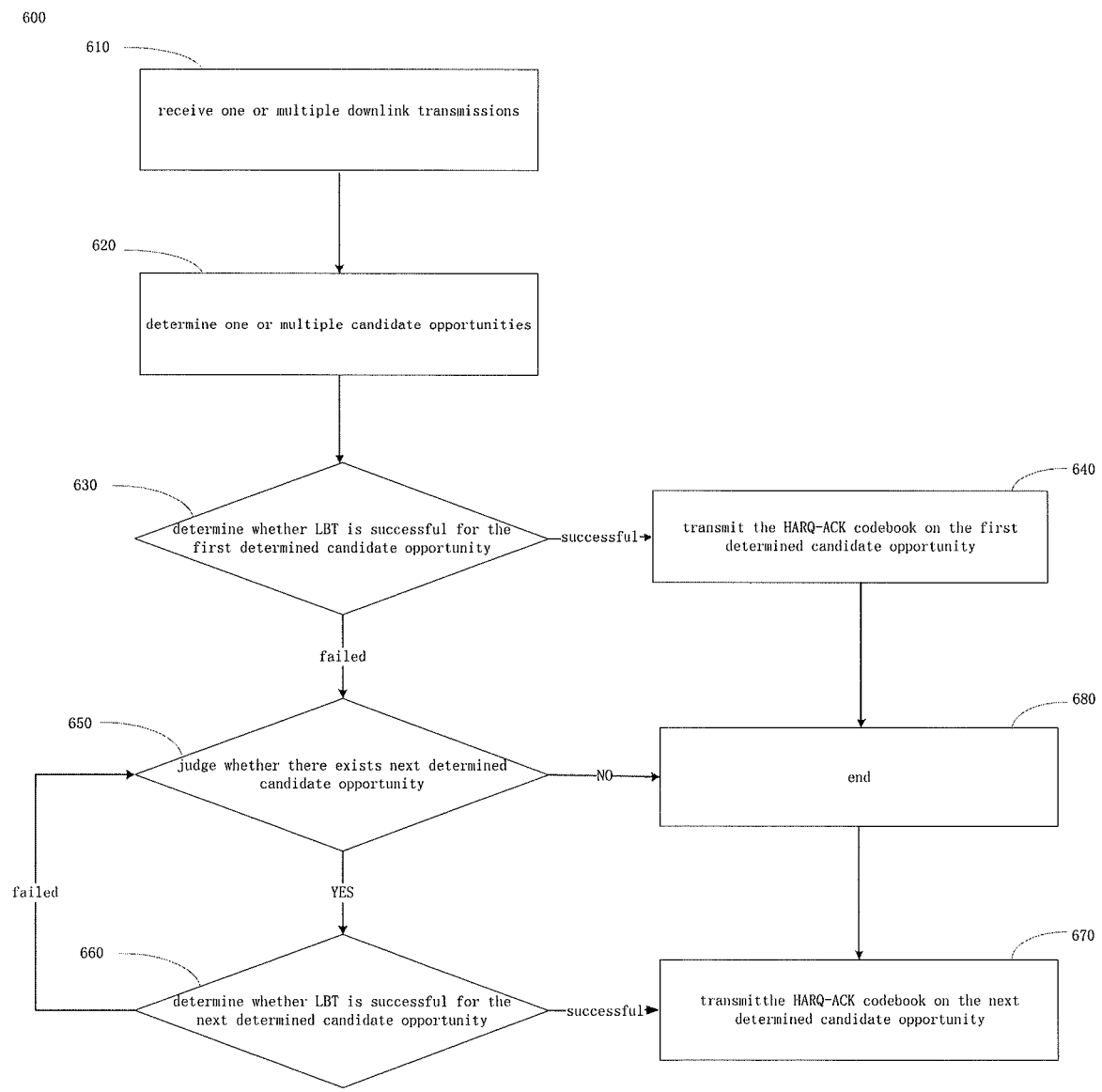
FIG. 6 is a flow chart diagram illustrating a method for HARQ-ACK codebook transmission on unlicensed spectrum.

FIG. 6 a flow chart diagram illustrating a method performed at UE for HARQ-ACK transmission on unlicensed spectrum.

In step 610, the UE receives one or multiple downlink transmissions within a channel occupancy initiated by gNB.

In step 620, the UE determines one or multiple candidate slots for transmission of a HARQ-ACK codebook corresponding to the one or multiple downlink transmissions. In particular, each of the above-described first to ninth embodiments may be used to determine the one or multiple candidate slots.

In step 630, the UE determines whether LBT is successful for the first determined candidate slot. In the condition that the LBT is successful in step 630, the UE transmits the HARQ-ACK codebook on the first determined candidate slot in step 640. And the method 600 ends.

On the other hand, if the LBT is not successful in step 630, the UE judges whether there exists next determined candidate slot in step 650.

If the judgement is YES in step 650, the UE determines whether LBT is successful for the next determined candidate slot in step 660. If the determination is successful in step 660, the UE transmits the HARQ-ACK codebook on the next determined candidate slot in step 670. If the determination is not successful in step 660, the UE re-performs step 650 to checks whether there exist more determined candidate slots (a next determined candidate slot).

If the judgement is NO in step 650, there is no more determined candidate slot for the UE to attempt to transmit the HARQ-ACK codebook. And the method 600 ends.

As a whole, when the UE receives downlink transmission, it determines one or multiple candidate slots for transmission of the HARQ-ACK codebook. Once LBT is successful for a determined candidate slot, the UE transmits the HARQ-ACK codebook on the determined candidate slot. If LBT is failed for all of the determined candidate slots, the HARQ-ACK codebook will not be transmitted.

Figure 7:
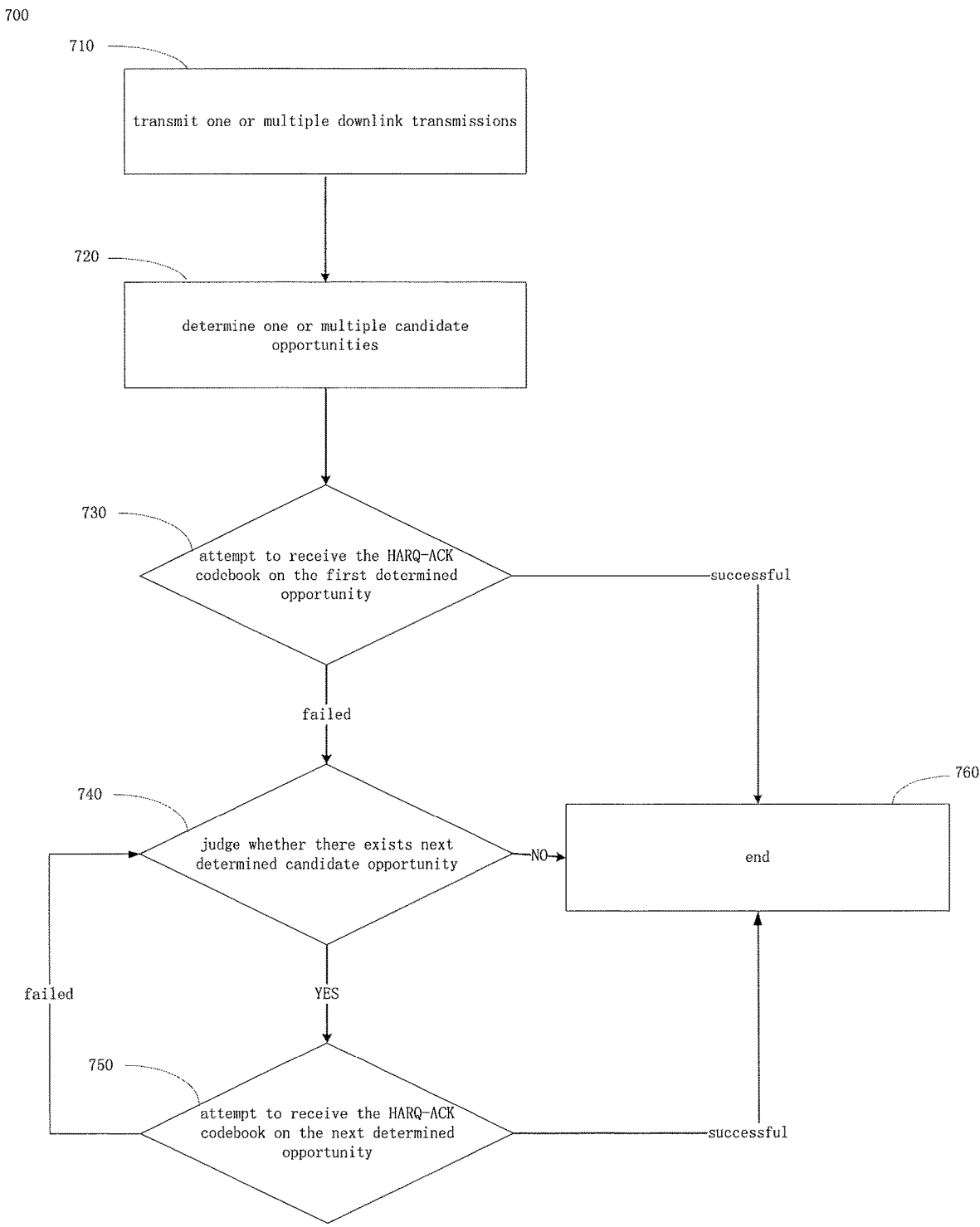
FIG. 7 is a flow chart diagram illustrating a method for HARQ-ACK codebook reception on unlicensed spectrum.

FIG. 7 is a flow chart diagram illustrating a method performed at gNB for HARQ-ACK reception on unlicensed spectrum.

In step 710, the gNB transmits one or multiple downlink transmissions within initiated channel occupancy to UE.

In step 720, the gNB determines one or multiple candidate slots for reception of a HARQ-ACK codebook corresponding to the one or multiple downlink transmissions. In particular, each of the above-described first to ninth embodiments may be used to determine the one or multiple candidate slots.

In step 730, the gNB attempts to receive the HARQ-ACK codebook on the first determined slot. If the reception of the HARQ-ACK codebook is successful in step 730, the method ends in step 760.

If the attempt is failed in step 730, the gNB judges whether there exists next determined candidate slot in step 740. If the judgement is YES in step 740, the gNB attempts to receive the HARQ-ACK codebook on the next determined candidate slot in step 750.

If the attempt is failed in step 750, the gNB re-performs step 740 to judge whether there exists next determined candidate slot.

Once the attempt (the reception of the HARQ-ACK codebook) is successful in step 750, the method ends in step 760.

If the judgement is NO in step 740, there is no additional determined candidate slot for the gNB to attempt to receive the HARQ-ACK codebook.

As a whole, after the gNB transmits downlink transmission, it determines one or multiple candidate slots for reception of a HARQ-ACK codebook corresponding to the downlink transmission. The gNB attempts to receive the HARQ-ACK codebook on each of the determined candidate slots sequentially until one of the attempts is successful. If all of the attempts are failed, the HARQ-ACK codebook can't be received.

In the above embodiments, one transmission opportunity corresponds to one slot. However, it is applicable that a plurality of transmission opportunities may be configured in the same slot. In other words, in one slot, there may be at least one transmission opportunity for one HARQ-ACK codebook.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A remote unit comprising:
a receiver that receives, from a base unit, one or multiple downlink transmissions within a channel occupancy time initiated by the base unit, a first message indicating a first candidate opportunity for transmission of a hybrid automatic repeat request-acknowledgement codebook corresponding to the one or multiple downlink transmissions and a second message indicating a number of allowed opportunities for transmission of the hybrid automatic repeat request-acknowledgement codebook;
a processor that determines the hybrid automatic repeat request-acknowledgement codebook and a number of total candidate opportunities for transmission of the hybrid automatic repeat request-acknowledgement codebook; and
a transmitter that, in response to a channel access for the first candidate opportunity being successful, transmits the hybrid automatic repeat request-acknowledgement codebook in the first candidate opportunity, and, in response to the channel access for the first candidate opportunity being failed and the number of the total candidate opportunities being larger than one, attempts to transmit the hybrid automatic repeat request-acknowledgement codebook in a second candidate opportunity.

2. The remote unit of claim 1, wherein the processor determines the number of total candidate opportunities based on the first candidate opportunity being inside or outside of the channel occupancy time.

3. The remote unit of claim 2, wherein the number of total candidate opportunities is equal to one in response to the first candidate opportunity being inside of the channel occupancy time, and is equal to the number of allowed opportunities in response to the first candidate opportunity being outside of the channel occupancy time.

4. The remote unit of claim 1, wherein the first message is received in a radio resource control signaling and the receiver further receives an indicator in downlink control indicator indicating enabling or disabling multiple opportunities for transmission of the hybrid automatic repeat request-acknowledgement codebook.

5. The remote unit of claim 4, wherein the processor determines the number of total candidate opportunities being equal to one in response to the indicator indicating disabling multiple opportunities, and being equal to the number of allowed opportunities in response to the indicator indicating enabling multiple opportunities.

6. The remote unit of claim 1, wherein the receiver further receives an indicator indicating the first candidate opportunity being inside or outside of the channel occupancy time.

7. The remote unit of claim 6, wherein the processor determines the number of total candidate opportunities being equals to one in response to the indicator indicating the first candidate opportunity being inside of the channel occupancy time, and being equal to the number of allowed opportunities in response to the indicator indicating the first candidate opportunity being outside of the channel occupancy time.

8. The remote unit of claim 6, wherein the processor further determines the type of the channel access being listen before talk category 2 with at least 25 μs clear channel assessment in response to the first candidate opportunity being inside of the channel occupancy time, and being listen before talk category 4 in response to the first candidate opportunity being outside of the channel occupancy time.

9. The remote unit of claim 1, wherein the first message is received in downlink control indicator and the number of the total candidate opportunities is equal to the number of the allowed opportunities.

10. The remote unit of claim 1, wherein the receiver receives a radio resource control signaling for configuring a set of values each of which indicates a number of allowed opportunities, and the first message is received in downlink control indicator for indicating one value of the set.

11. The remote unit of claim 1, wherein the receiver receives a radio resource control signaling for configuring a set of physical uplink control channel resources each of which includes resource repetition information, and the first message is received in downlink control indicator for indicating one resource of the set.

12. The remote unit of claim 1, wherein the receiver receives a radio resource control signaling for configuring multiple subsets in a set of physical downlink shared channel-to-hybrid automatic repeat request timing values and each of the multiple subsets includes one or multiple opportunities for transmission of the hybrid automatic repeat request-acknowledgement codebook, and the first message is received in downlink control indicator for indicating one subset of the set of physical downlink shared channel-to-hybrid automatic repeat request timing values.

13. The remote unit of claim 1, wherein the receiver receives a radio resource control signaling for configuring multiple subsets in a set of physical downlink shared channel-to-hybrid automatic repeat request timing values and each of the multiple subsets includes the first candidate opportunity and the number of allowed opportunities, and the first message is received in downlink control indicator for indicating one subset of the set of physical downlink shared channel-to-hybrid automatic repeat request timing values.

14. A method at a remote unit comprising:
receiving, from a base unit, one or multiple downlink transmissions within a channel occupancy time initiated by the base unit, a first message indicating a first candidate opportunity for transmission of a hybrid automatic repeat request-acknowledgement codebook corresponding to the one or multiple downlink transmissions and a second message indicating a number of allowed opportunities for transmission of the hybrid automatic repeat request-acknowledgement codebook;
determining the hybrid automatic repeat request-acknowledgement codebook and a number of total candidate opportunities for transmission of the hybrid automatic repeat request-acknowledgement codebook; and
in response to a channel access for the first candidate opportunity being successful, transmitting the hybrid automatic repeat request-acknowledgement codebook in the first candidate opportunity, and, in response to the channel access for the first candidate opportunity being failed and the number of the total candidate opportunities being larger than one, attempting to transmit the hybrid automatic repeat request-acknowledgement codebook in a second candidate opportunity.

15. A base unit comprising:
a transmitter that transmits, to a remote unit, one or multiple downlink transmissions within a channel occupancy time, a first message indicating a first candidate opportunity for transmission of a hybrid automatic repeat request-acknowledgement codebook corresponding to the one or multiple downlink transmissions and a second message indicating a number of allowed opportunities for transmission of the hybrid automatic repeat request-acknowledgement codebook; and
a receiver that attempts to receive the hybrid automatic repeat request-acknowledgement codebook in the first candidate opportunity, and attempts to receive the hybrid automatic repeat request-acknowledgement codebook in a second candidate opportunity in response to the reception of the hybrid automatic repeat request-acknowledgement codebook in the first candidate opportunity being failed and the number of a total candidate opportunities being larger than one.

16. The base unit of claim 15, wherein the transmitter further transmits an indicator in downlink control indicator indicating enabling or disabling multiple opportunities for transmission of the hybrid automatic repeat request-acknowledgement codebook.

17. The base unit of claim 15, wherein the transmitter further transmits an indicator indicating the first candidate opportunity being inside or outside of the channel occupancy time.

18. The base unit of claim 15, wherein the transmitter further transmits a radio resource control signaling for configuring a set of values each of which indicates a number of allowed opportunities, and the first message is transmitted in downlink control indicator for indicating one value of the set.

19. The base unit of claim 15, wherein the transmitter transmits a radio resource control signaling for configuring multiple subsets in a set of physical downlink shared channel-to-hybrid automatic repeat request timing values and each of the multiple subsets includes one or multiple opportunities for transmission of the hybrid automatic repeat request-acknowledgement codebook, and the first message is transmitted in downlink control indicator for indicating one subset of the set of physical downlink shared channel-to-hybrid automatic repeat request timing values.

20. The base unit of claim 15, wherein the transmitter transmits a radio resource control signaling for configuring multiple subsets in a set of physical downlink shared channel-to-hybrid automatic repeat request timing values and each of the multiple subsets includes the first candidate opportunity and the number of allowed opportunities, and the first message is transmitted in downlink control indicator for indicating one subset of the set of physical downlink shared channel-to-hybrid automatic repeat request timing values.

* * * * *